United States Patent [19]

Fujimaki

[11] Patent Number: 5,204,824
[45] Date of Patent: Apr. 20, 1993

[54] METHOD OF AND APPARATUS FOR COPY CONTROLLING COORDINATE MEASURING PROBE WITH ROTARY TABLE

[75] Inventor: Shigeru Fujimaki, Kawasaki, Japan

[73] Assignee: Mitutoyo Corporation, Tokyo, Japan

[21] Appl. No.: 571,147

[22] Filed: Aug. 23, 1990

[30] Foreign Application Priority Data

Aug. 29, 1989 [JP] Japan .................................. 1-222508

[51] Int. Cl.$^5$ ............................................. G06F 15/46
[52] U.S. Cl. ........................... 364/474.03; 364/474.37; 33/503
[58] Field of Search ....................... 364/474.03, 474.05, 364/474.31, 560, 561, 564, 565; 33/503, 516, 505, 1 N, 504; 318/578

[56] References Cited

U.S. PATENT DOCUMENTS

| | | | |
|---|---|---|---|
| 4,342,091 | 7/1982 | Whitehouse et al. | 33/505 |
| 4,428,055 | 1/1984 | Kelley et al. | 364/474.37 |
| 4,549,271 | 10/1985 | Nozawa et al. | 364/474.37 |
| 4,583,159 | 4/1986 | Kanemoto et al. | 364/474.37 |
| 4,807,153 | 2/1987 | Lane et al. | 364/474.37 |
| 4,819,339 | 4/1989 | Kunzmann et al. | 33/503 |
| 4,958,438 | 9/1990 | Hemmegarn | 33/503 |

FOREIGN PATENT DOCUMENTS

| | | |
|---|---|---|
| 1402616 | 8/1975 | United Kingdom . |
| 1529421 | 10/1978 | United Kingdom . |
| 2008796 | 6/1979 | United Kingdom . |
| 2026203 | 1/1980 | United Kingdom . |

Primary Examiner—Jerry Smith
Assistant Examiner—Jim Trammell
Attorney, Agent, or Firm—Seed and Berry

[57] ABSTRACT

For copy measuring the coordinates of an object to be measured using a coordinate measuring probe by disposing a rotary table on a platen of a coordinate measuring machine and placing the object on said rotary table and further rotating the object through said rotary table, there are calculated a speed vector $\bar{V}$ of the probe when the rotary table is stationary at the rotational angle $\theta$ and an angular velocity $\omega$ of the rotary table by said probe speed vector $\bar{V}$ viewed from the axis center of the object, and lead and retardation of said rotational angle $\theta$ is adjusted so as to keep unchanged an angular relationship between the object and the probe to determine the angular velocity $\omega$ anew. Further, there is calculated a speed vector $\bar{V}_R$ that follows up the movement of said angular velocity $\omega$, and the vector sum $\bar{V}_T = \bar{V} + \bar{V}_R$ is issued as a speed command to the probe and said angular velocity $\omega$ is issued as a speed command to the rotary table. Therefore, one axis copy control owing to the rotary table is incorporated in addition to three-axis copy control of the probe when the rotary table is not used, to perform simultaneous four-axis copy control keeping unchanged the angular relationship between the object and the probe.

8 Claims, 7 Drawing Sheets

METHOD OF AND APPARATUS FOR COPY CONTROLLING COORDINATE MEASURING PROBE WITH ROTARY TABLE

BACKGROUND OF THE INVENTION

1. Field of the Invention

The present invention relates to a method of and an apparatus for copy controlling a coordinate measuring probe with a rotary table, and more specifically to a method of and an apparatus for copy controlling a coordinate measuring probe with a rotary table suitable for use in a three-dimensional coordinate measuring machine. The rotary table is settled on a platen of a coordinate measuring machine, and an object (workpiece) to be measured is placed on the rotary table and rotated by the same to copy measure the coordinates of the workpiece using the coordinate measuring probe. One axis by the rotary table is incorporated in the three-axis copy control of the probe when the rotary table is not used, that has already been realized, and copy operation by simultaneous four-axes control is assured keeping unchanged a direction of the probe with regard to an axis center of the object.

2. Description of the Prior Art

For measuring the shape of an object to be measured using a coordinate measuring machine such as a three-dimensional (3-D) coordinate measuring machine or the like, it is necessary to copy measure the coordinates of the object in succession with a coordinate measuring probe such as a touch signal probe and a copying probe, etc. For automated methods that automatically achieve such copy control utilizing a computer but without use of the rotary table, there have already been developed and realized two control methods: one where copy control is performed along the contour of a workpiece keeping the height of the probe constant from an arbitrarily assigned reference plane (hereinafter, referred to as constant height copying), and the other where copy control is performed along the contour of a workpiece in a cylindrical plane defined by an arbitrarily assigned radius from an arbitrarily assigned straight reference line (hereinafter, referred to as constant radius copying).

There is, however, found no copy control method with use of a rotary table, that satisfies necessary conditions.

Figure 2:
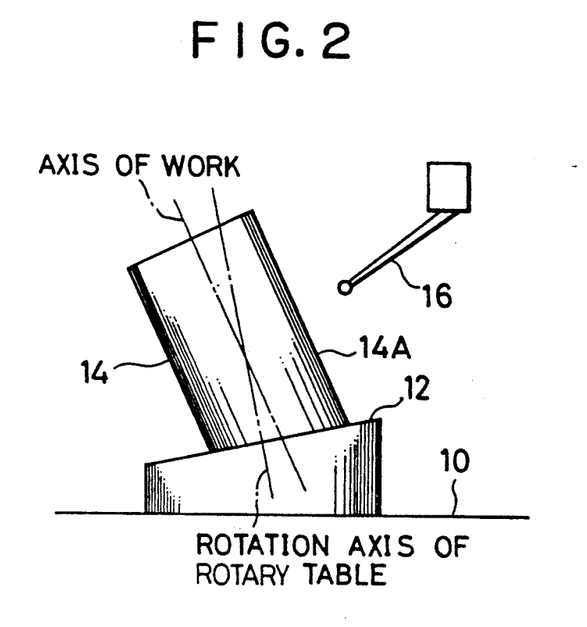
FIGS. 2 through 7 are diagrams illustrating the principle of the present invention.

As illustrated in FIG. 2, it is typical to set a rotary table 12 on a platen 10 of a coordinate measuring machine. parallely or perpendicularly to an axis X, Y or Z of the coordinate measuring machine. Such parallel or perpendicular installation of the rotary table is difficult, however, and care must be taken to ensure that the rotary table 12 can be mounted or demounted. Accordingly, conditions must be taken into consideration that the rotary table 12 should be placed on the platen 10 at an arbitrary position and with an arbitrary inclination independently of the axis of the coordinate measuring machine.

Additionally, the same can be said for an interrelation between an object 14 to be measured (a workpiece for example) placed on the rotary table 12 and the axis of rotation of the rotary table 12. More specifically, although it is common to place the workpiece 14 on the rotary table 12 such that a measuring reference line of the workpiece 14 is coincident with the axis of rotation of the rotary table 12, it is preferable to allow the workpiece 14 to be placid on the rotary table 12 at an arbitrary position and with an arbitrary inclination.

It is imagined that any lack of the foregoing two conditions would bring about very severe restriction to actual use of the apparatus.

Figure 3:
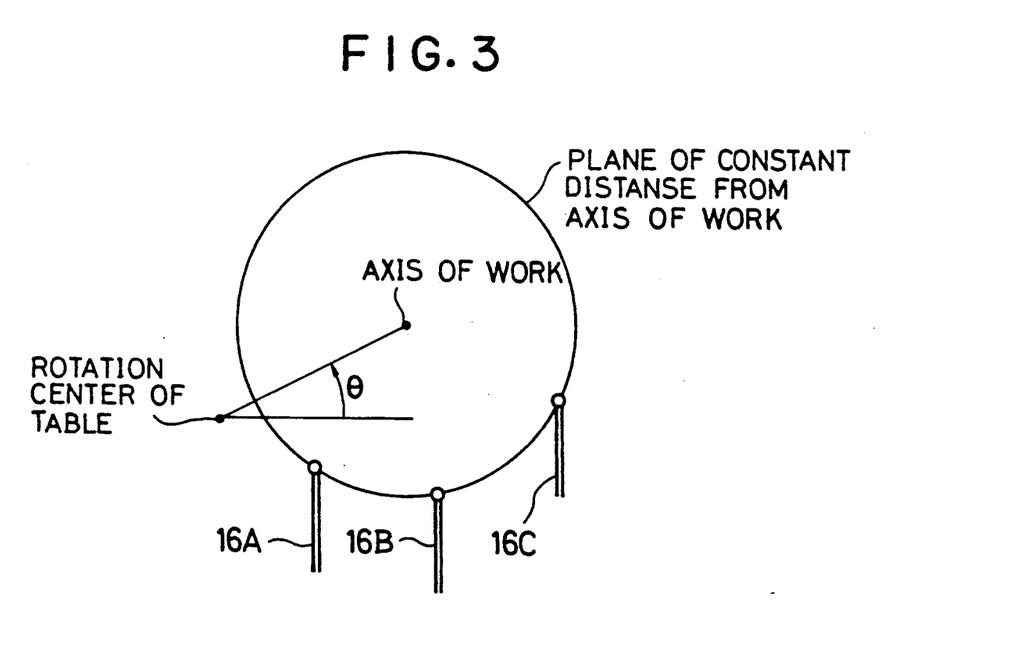

Further, for a given positional relationship between the probe 16 and the workpiece 14, when the probe 16 is performing constant radius, copying, the position of the probe is measured with respect to a given radius from an imaginary measuring reference line (work axis, for example). However, this operating configuration allows innumerable positional relations as illustrated in FIG. 3. More specifically, any of the probes 16A, 16B, and 16C shown in FIG. 3 is located on a plane spaced away a predetermined distance from the work axis so that there are existent innumerable combinations of probe positions with respect to a certain rotation angle $\theta$ of the rotary table 12 under the restriction only of the distance from the work axis. Therefore, data processing becomes very complicated.

Figure 4:
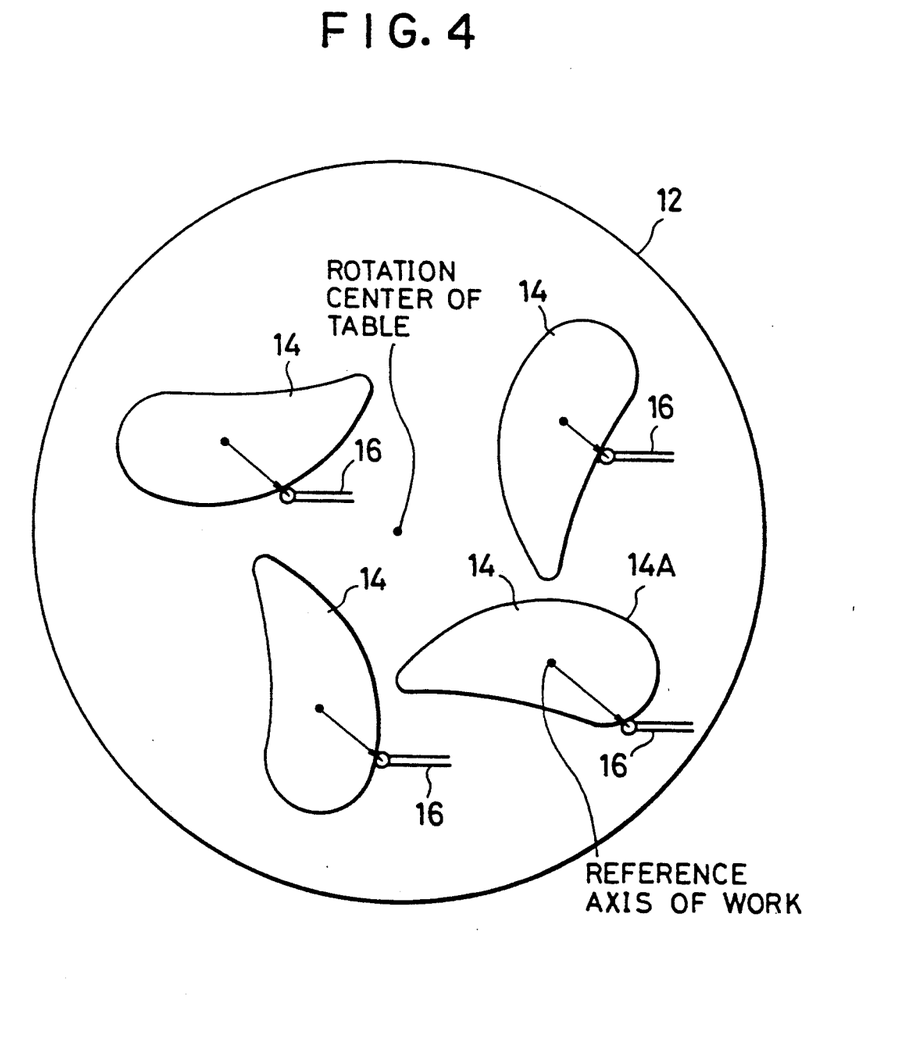

The rotary table 12 is preferably used to position the workpiece 14 so that only tip of the probe 16 (and not the body of the probe 16) makes contact with the workpiece 14. Preferably, a line connecting the measuring ball of the probe 16 to the measuring reference line of the work intersects the reference line at a constant angle even when the Table 12 (i.e. the workpiece 14) rotates as shown in FIG. 4. FIG. 4 is a plan view illustrating the situation of the rotary table 12 viewed from the just above portion of the rotation axis of the rotary table 12 when the rotation axis of the rotary table 12 and the work axis measuring reference line are parallel to each other. In the figure, the angle of the probe 16 relative to the rotation axis of the rotary table 12 is maintained constant at all times.

To sum up, the copy control method and apparatus using a rotary table should satisfy the following three conditions:

No. 1. The rotary table can be set on the platen of the coordinate measuring machine at an arbitrary position and at an arbitrary angle.

No. 2. A workpiece can be mounted on the rotary table at an arbitrary position and an arbitrary angle.

No. 3. The angle of the probe should be maintained constant during a copy measurement.

There is, however, found no rotary table copy control method that satisfies such conditions, until now.

SUMMARY OF THE INVENTION

In view of the drawbacks with the prior art, it is an object of the present invention to provide a rotary table copy control method and an apparatus therefor in a coordinate measuring probe that satisfies the aforementioned three conditions by adopting a prior copy control method that does not employ a rotary table.

To achieve the above object, the present invention comprises, for copy measuring the coordinates of an object to be measured using a coordinate measuring probe by disposing a rotary table on a platen of a coordinate measuring machine and placing the object on the rotary table to rotate the object through the rotary table, the steps of determining a probe speed vector $\vec{V}$ of the probe when the rotary table is at a rotational angle $\theta$, of calculating the angular velocity $\omega$ of the rotary table relative to a measuring reference line of the object and correcting the angular velocity $\omega$ by adjusting the lead and retardation due to control error of the rotational angle $\theta$ from target value so as to keep unchanged a direction of the probe with regard to the measuring reference line of the object. The method and apparatus also calculates a follow-up speed vector $\vec{V}_R$ that compensates the movement by the corrected angular velocity $\omega$, and calculates the vector sum $\vec{V}_T(=\vec{V}+\vec{V}_R)$ of the follow-up speed vector $\vec{V}_R$ and said probe speed vector $\vec{V}$ as a probe speed command. The method and apparatus also generates a corrected angular velocity $\omega$ a speed command of the rotary table, whereby one axis copy control owing to the rotary table is incorporated in addition to the three axis copy control of the probe in the case where no rotary table is used, to establish simultaneous four-axis simultaneous copy control keeping unchanged the direction of the probe with regard to the measuring reference line of the object.

The rotary table copy control according to the present invention copy controls the rotary table 12 and the probe 16 such that the direction of the vector directed from a measuring reference line to a tip end of the probe is kept unchanged whatever the rotational angle $\theta$ of the rotary table is, as illustrated in FIG. 4. Herein, for simplicity, the axis (measuring reference line) of the work 14 is drawn parallely to the rotational axis of the rotary table 12.

In the following, the principle of the method of copy control according to the present invention that satisfies the aforementioned three conditions will be described.

Figure 5:
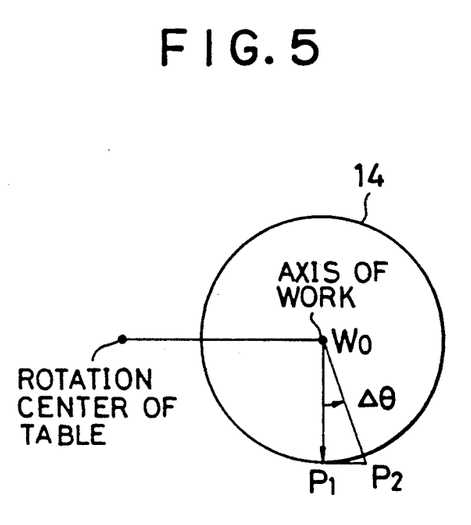

As illustrated in FIG. 5, the rotational angle of the rotary table at a certain time t is assumed to be $\theta$. At this time, a probe speed vector $\vec{V}$ determined by prior constant radius copy operation of three axis is assumed to be supplied to the probe. The probe speed vector $\vec{V}$ is a three-dimensional one. The probe copies operation over a small interval from $P_1$ to $P_2$ after a small time $\Delta t$ according to the probe speed vector $\vec{V}$. Therefore, the probe, the tip end of which is located at the point $P_1$, reaches the point $P_2$ after the lapse of the time $\Delta t$.

Figure 6:
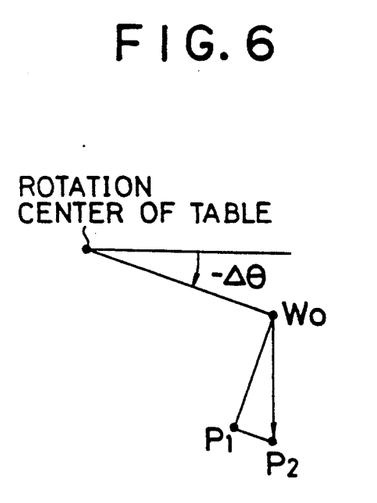

Assumed now an angle ($\angle P_1 W_0 P_2$) on a rotary table plane between a vector connecting a point $W_0$ on the axis center (measuring reference line) of the work 14 with the point $P_1$ and a vector connecting the point $W_0$ with the point $P_2$ to be $\Delta\theta$, the vector $\overrightarrow{W_0 P_2}$ after $\Delta t$ has the same direction as the vector $\overrightarrow{W_0 P_1}$ at time t (refer to FIG. 5) provided that the rotary table is rotated $\Delta\theta$ after $\Delta t$ oppositely to the direction of the advance of the probe, as illustrated in FIG. 6. The angular velocity of the rotary table at that time is assumed to be $\omega$.

The probe speed vector $\vec{V}$ is a control vector of the probe when the rotary table is supposed to be imaginary stopped. Therefore, when the angular velocity is actually imparted to the rotary table, the probe becomes out of a control target where the radius or the height are constant if the vector $\vec{V}$ is kept unchanged.

Figure 7:
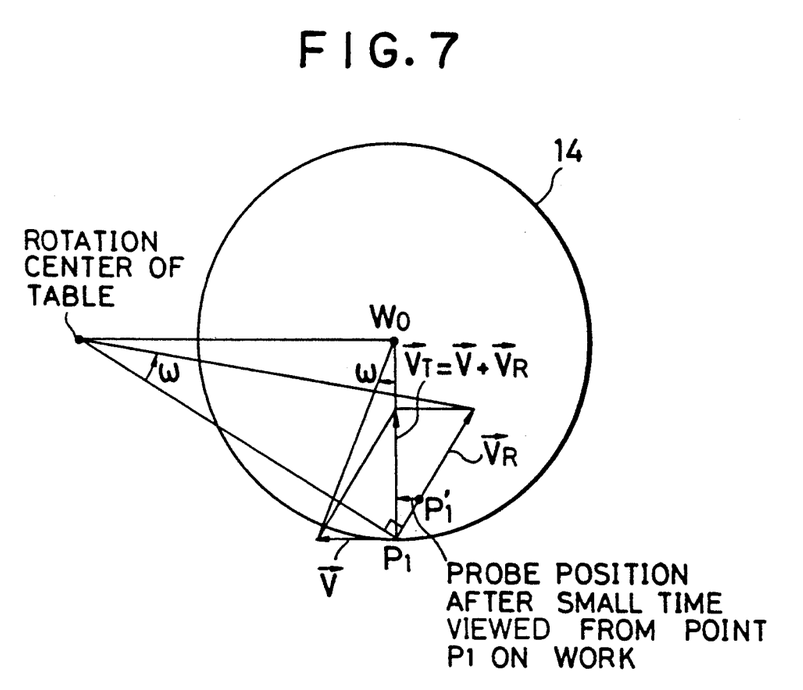

To solve this, the present invention cancels out the effect of the rotation of the rotary table by adding to $\vec{V}$ a follow-up speed vector $\vec{V}_R$ that follows up the angular movement of the angular velocity $\omega$ of the rotary table, as illustrated in FIG. 7. The follow-up speed vector $\vec{V}_R$ is a tangency vector at the point $P_1$ when the angular vector $\omega$ is imparted to the rotary table at the time t. In the figure, a point $P_1'$ indicates a position of the point $P_1$ on the work after the lapse of small time.

Accordingly, a probe speed vector $\vec{V}_T$ to be imparted to the probe is given by $$\vec{V}_T = \vec{V} + \vec{V}_R \quad (1)$$

A desired movement of the probe can therefore be realized by issuing as speed commands the probe speed vector $\vec{V}_T$ and the angular velocity $\omega$ of the rotary table in each sampling time.

Herein, in case of the copy operation without use of the rotary table, the copying speed is the probe speed itself. On the contrary, when both probe and work are movable as in the present invention, the copying speed should by understood as being a relative speed, not the probe speed, between the work and the probe. In the present invention, the copying speed is naturally developed from the relative speed to the probe speed and further to the rotary table speed.

In accordance with the present invention, the one axis copy control by the rotary table is incorporated in addition to the three-axis copy control by the probe where no use is made of the rotary table, for achieving the simultaneous four-axis control, satisfying the aforementioned three conditions.

Figure 8:
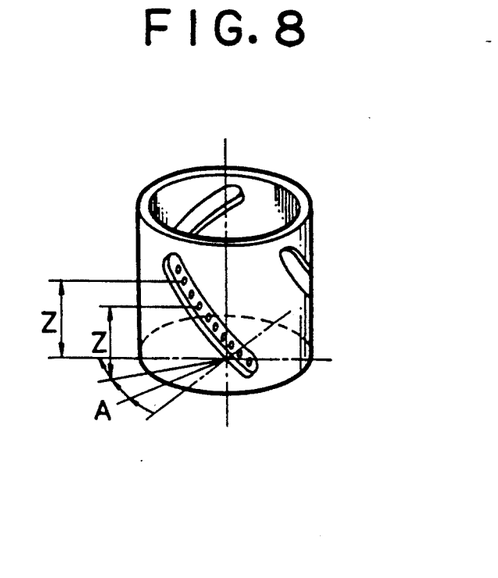
FIGS. 8 through 10 are perspective views and a front view each illustrating an exemplary object to be measured for which the present invention is useful.
Figure 9:
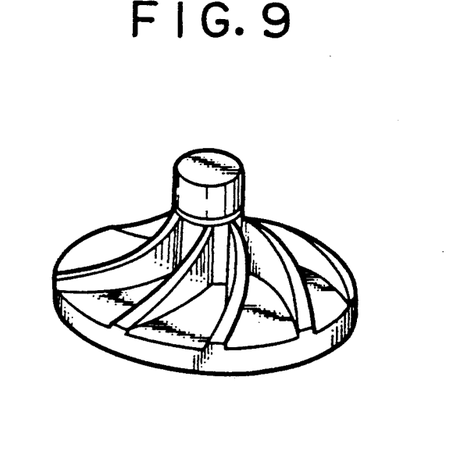
Figure 10:
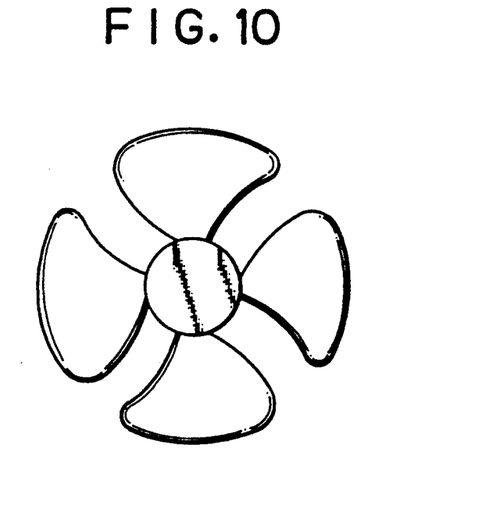

Accordingly, even in the case where a cylindrical cam as illustrated in FIG. 8, for example, is measured wherein a single measurement is unsatisfactory because of the interference between the work and the probe without using the rotary table, the present invention establishes a measurement over the whole circumstance of the cam at a time without altering the direction of the probe by using the rotary table. It should be noted here that although there are many cases such as these with an impeller shown in FIG. 9 and a propeller blade shown in FIG. 10 for example where a single measurement is impossible even with application of the present invention, the present invention is, even under such difficulty, capable of reducing the number of times of direction alteration of the probe.

According to the present invention, as described above, use is made of the rotary table which assures expansion of a measurement range and establishes a measurement on a more complicated work.

BRIEF DESCRIPTION OF THE DRAWINGS

The exact nature of this invention, as well as other object and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENTS

In what follows, an embodiment of the present invention will be described with reference to the accompanying drawings.

Figure 11:
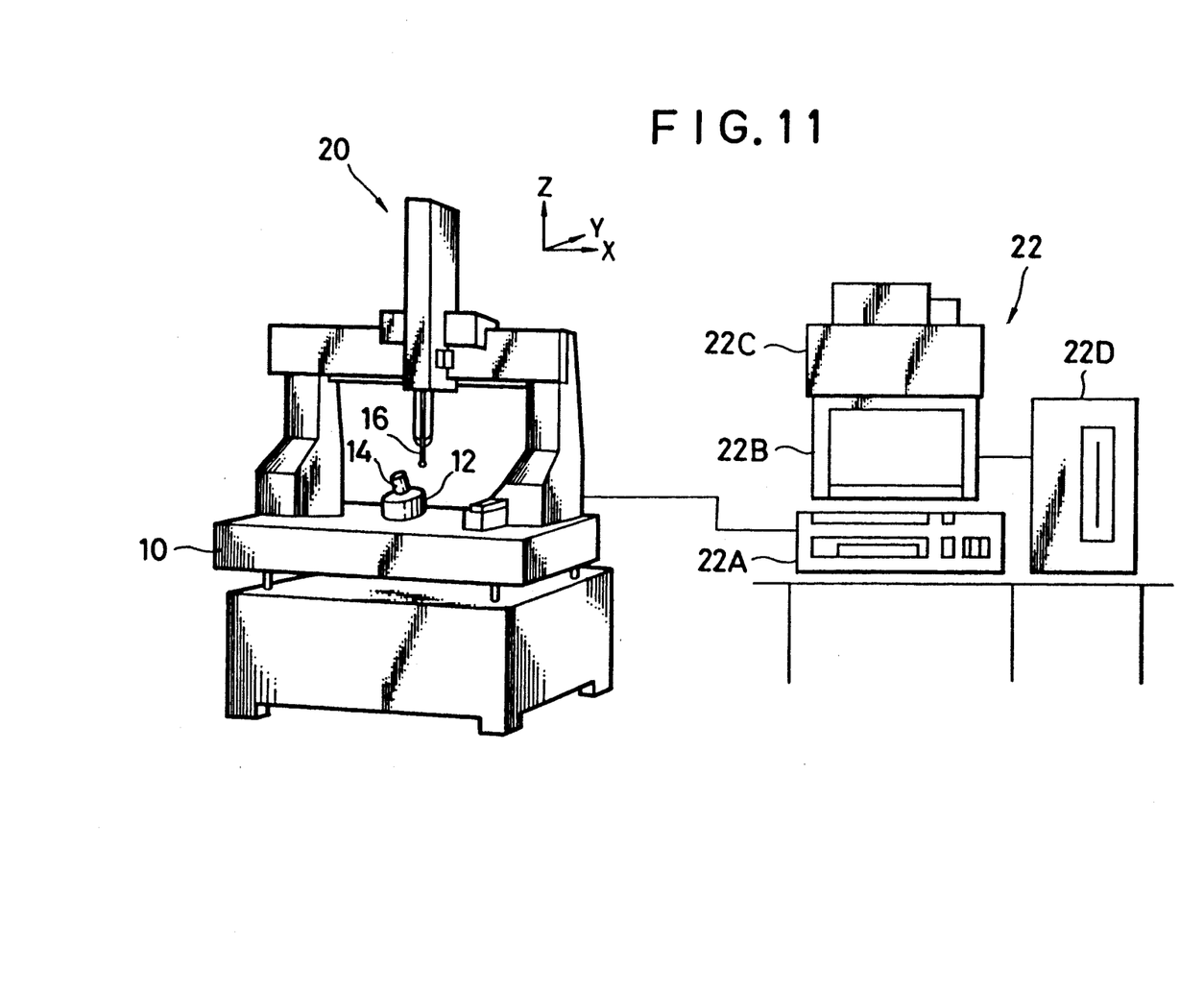
FIG. 11 is a perspective view illustrating an exemplary construction of a three-dimensional coordinate measuring machine to which the present invention is applicable.

The present embodiment is applicable to a case for example wherein a three-dimensional coordinate measuring machine 20 including a coordinate measuring copy probe 16 as illustrated in FIG. 11 is used, a rotary table 12 is disposed on a platen 10 and a work 14 are placed on the rotary table 12, and further the coordinates of the work 14 is copy measured using the copy probe 16 by rotating the work 14 through the rotary table 12.

Programs for performing processing associated with the present embodiment is stored in a memory device 22D of a control unit 22 that includes a central processing unit 22A, a CRT 22B, a printer 22C, and the memory device 22D.

For the copy probe 16, there is useable a contact type displacement detecting probe that incorporates an air bearing and a linear encoder for example. A displacement output from the probe 16 is fed back to the coordinate measuring machine 20 to permit the probe 16 to automatically copy measure the contour of the work 14.

Figure 1A:
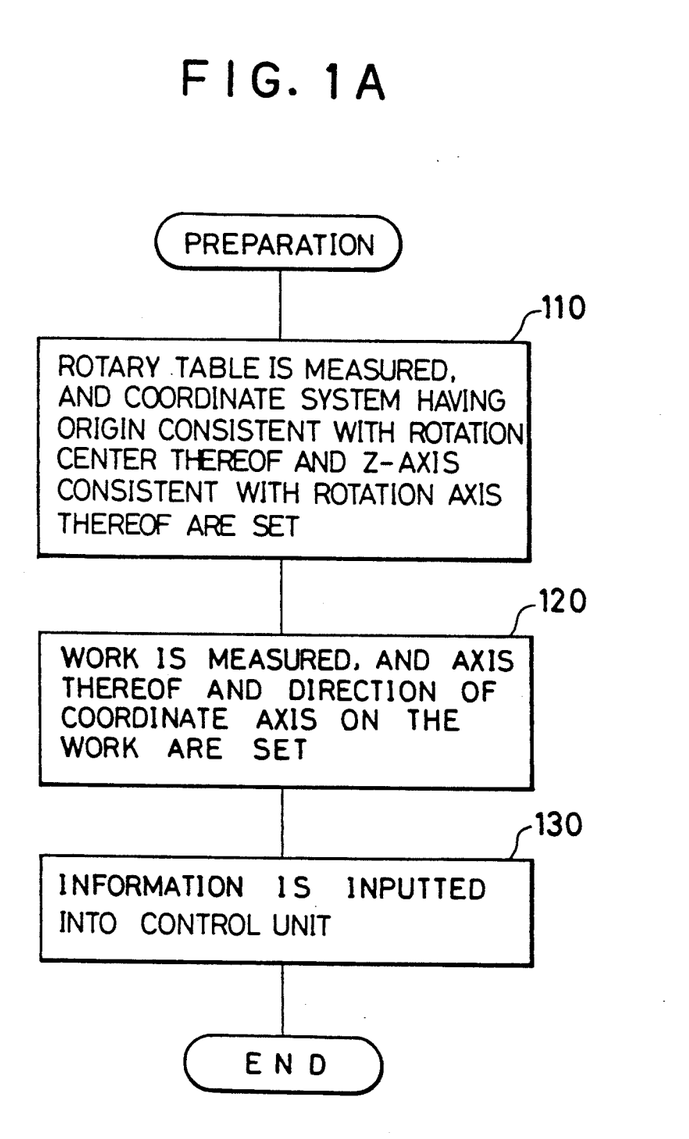
FIGS. 1A and 1B are flow charts illustrating procedures during preparations and copy operation in an embodiment of the present invention, respectively.
Figure 1B:
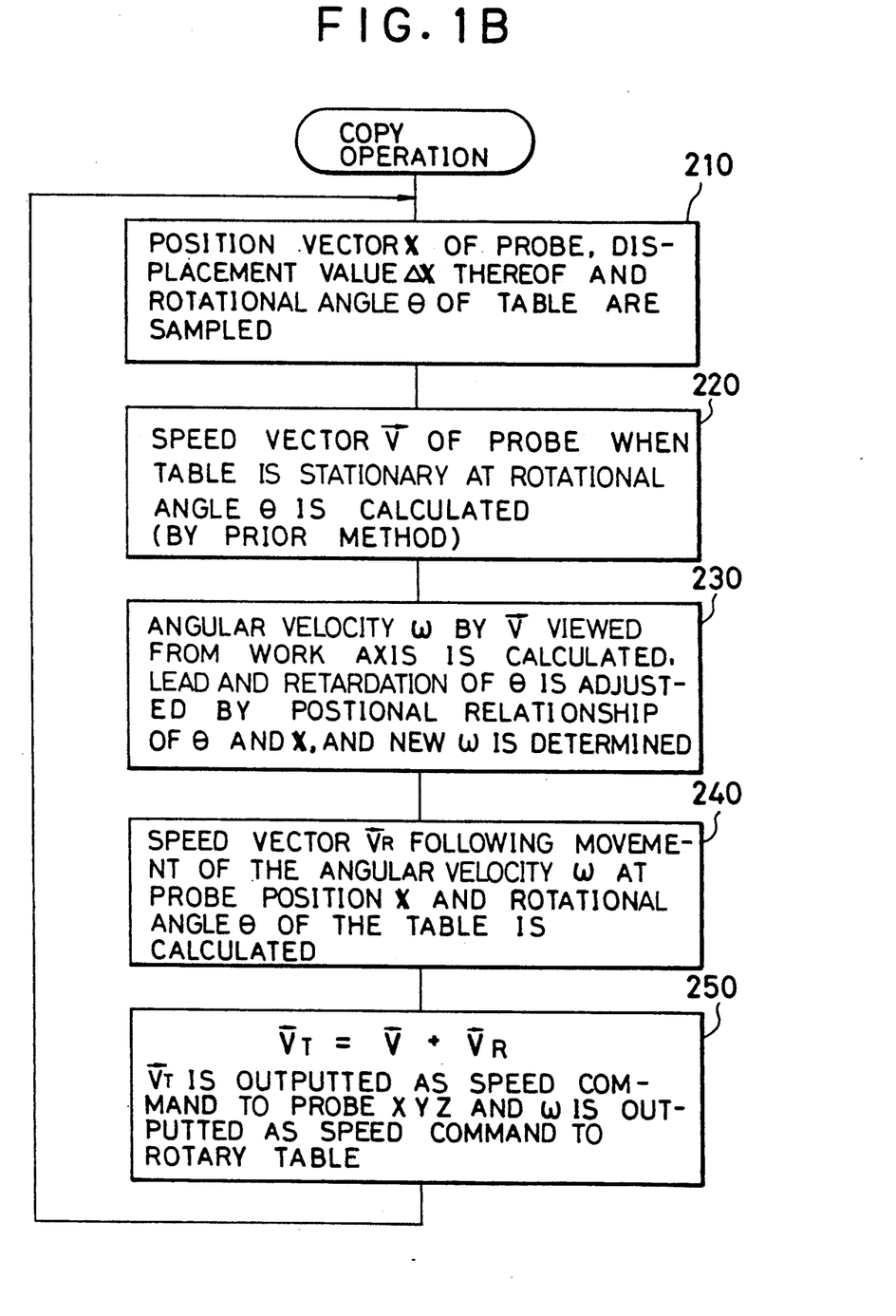

Referring further to FIGS. 1A and 1B, procedures by the embodiment will be described in detail.

FIG. 1A illustrates procedures of preparation. In the preparation, first in a step 110, the center of rotation and the direction of the axis center of the rotary table 12 are measured to prepare a coordinate system which takes the center of rotation as the origin and the direction of the axis center as the axis Z. The coordinate system as above makes it easy to process data. Herein, the position and the angle (altitude) of the rotary table 12 on the platen 10 may be selected arbitrarily (refer to No. 1 of the aforementioned three conditions).

Then, in a step 120 characterizing portions for determining measuring reference line of, the work 14 placed on the rotary table 12 is measured by the probe to set the axis center (measuring reference line), of the work 14 and the direction of the coordinate axes on the work 14. Herein, for placing the work 14 on the rotary table 12, the position may be selected arbitrarily (refer to No. 2 of the aforementioned three conditions).

Information obtained in the steps 110 and 120, is sent to the control unit 22 to complete the preparation in a step 130. The coordinate system of the work 14 on the rotary table 12 is used in the control unit 22 as a rule of coordinate conversion from the coordinate system of the rotary table 12 to a coordinate system of the coordinate measuring machine 20.

FIG. 1B illustrates procedures during the copy operation after completion of the preparation.

In the copy operation, first in a step 210, there are sampled in the interval of 40 msec for example the position vector $\vec{X}$ of the probe tips when the probe 16 makes contact with the work 14, the amount of the displacement $\Delta \vec{X}$ of the position vector $\vec{X}$, and the rotational angle $\theta$ of the rotary table 12.

In succession, in a step 220, the probe speed vector $\vec{V}$ of the probe 16 when the rotary table 12 is at the rotational angle $\theta$ is determined, by the prior method where no rotary table is used.

In a step 230, the angular velocity $\omega$ of the rotary table 12 by the probe speed vector $\vec{V}$ viewed from the axis center (measuring reference line) of the work 14 is calculated, and the lead or retardation due to control error of the actual rotational angle $\theta$ from target value $\theta$ is corrected as follows: corrected angle $W' = W + S(\theta' - \theta)$ where S: correction factor. Herein, the direction of the probe 16 with respect to the measuring reference line of the work 14 is kept unchanged (refer to No. 3 of the aforementioned three conditions).

In a step 240, the follow-up speed vector $\vec{V}_R$ that compensates the movement by the corrected angular velocity $\omega$ is calculated.

In a step 250, the vector sum $\vec{V}_T(\vec{V} + \vec{V}_R)$ of the follow-up speed vector $\vec{V}_R$ and the probe speed vector $\vec{V}$ is issued as the X, Y, and Z speed commands of the probe 16, and the corrected angular velocity $\omega$ is issued as the speed command of the rotary table 12 to respective driving mechanisms (not shown), and the operation returns to the step 210.

Although for the procedures during the copy operation, there are an output processing of data and a decision processing of the completion of the copy operation, etc., the description thereof is omitted here to avoid the description from being complicated.

Further, the output data is the center coordinates of the probe tip. The direction of the probe 16 with respect to the axis of the work 14 placed on the rotary table 12 is kept unchanged even though the rotary table 12 is rotated. This is considered as follows: the rotational plane of the rotary table 12 is regarded as a virtual platen of the coordinate measuring machine, and the work 14 is regarded as being settled on the virtual platen. Output data in a copy measurement takes a coordinate system that can be interpreted as being that in the measuring apparatus coordinate system. To convert the just-mentioned coordinate system to a work coordinate system, coordinate conversion may be taken only once.

Although in the present embodiment, the case with the copy operation of a constant radius was described, the same effect may be expected for a case with copy operation of a constant height.

Further, since in the present embodiment the contact type displacement detecting probe 16 was employed to enable a copy measurement to be done in contact with the work 14, efficiency of a shape measurement can greatly be improved compared with a contour measurement by a point measurement using a touch signal probe. Herein, it is clear that the present invention is not limited to such a contact type probe, but is also applicable to the just-mentioned touch signal probe.

What is claimed is:

1. A method of copy controlling a coordinate measuring probe with a rotary table, for copy measuring the coordinates of an object to be measured using the coordinate measuring probe by installing the rotary table on a platen of a coordinate measuring machine and placing said object on said rotary table to rotate the object by the rotary table, the method comprising the steps of;
    determining a probe speed vector $\vec{V}$ of the probe when the rotary table is at a rotational angle $\theta$;
    calculating the angular velocity $\omega$ of the rotary table by the probe speed vector $\vec{V}$ relative to a measuring reference line of the object and correcting said angular velocity $\omega$ to adjust the lead or retardation due to control error of said rotational angle $\theta$ from target value so as to keep unchanged a direction of said probe with regard to said measuring reference line of the object;
    calculating a follow-up speed vector $\vec{V}_R$ that compensates the movement by the corrected angular velocity $\omega$; and
    issuing as a speed command of the probe the vector sum $\vec{V}_T(=\vec{V}+\vec{V}_R)$ of said follow-up speed vector $\vec{V}_R$ and said probe speed vector $\vec{V}$ and issuing said corrected angular velocity $\omega$ as a speed command of the rotary table,
    whereby one axis copy control owing to the rotary table is incorporated in addition to three-axis copy control of the probe in the case where the rotary table is not employed, to achieve copy operation by simultaneous four-axes control keeping unchanged said direction of the probe with regard to said measuring reference line of the object.

2. A method according to claim 1 further comprising a step of measuring center of rotation and direction of the axis center of said rotary table to prepare a system of coordinates which takes said center of rotation as the origin and said axis center direction as an axis Z.

3. A method according to claim 2 wherein output data in a copy measurement that is done on said system of coordinates taking said rotary table as a reference is converted to that on a system of coordinates taking said object as a reference.

4. A method according to claim 1 further comprising a step of measuring by probe characterizing positions of said object placed on said rotary table to set the measuring reference line of the object and directions of coordinate axes on the object.

5. A method according to claim 1 wherein said probe speed vector $\vec{V}$ and said angular velocity $\omega$ of the rotary table are calculated from the position vector $\chi$ of the probe center sampled in a predetermined time interval, the amount $\Delta\chi$ of displacement of said position vector $\chi$, and the rotational angle $\theta$ of the rotary table.

6. A method according to claim 1 wherein the center coordinates of the probe tip measured with copy operation by said simultaneous four-axes control are outputted.

7. An apparatus for copy controlling a coordinate measuring probe with a rotary table, the apparatus comprising:

a coordinate measuring machine including a platen and the coordinate measuring probe;

the rotary table provided on the platen of said coordinate measuring machine for rotating an object to be measured;

means for determining a probe speed vector $\vec{V}$ of the probe when said rotary table is at a rotational angle $\theta$;

means for calculating the angular velocity $\omega$ of the rotary table by the probe speed vector $\vec{V}$ relative to a measuring reference line of the object and for correcting said angular velocity $\omega$ to adjust lead and retardation due to control error of said rotational angle $\theta$ from target value so as to keep unchanged a direction of said probe with regard to said measuring reference line of the object;

means for calculating a follow-up speed vector $\vec{V}_R$ that compensates the movement by the corrected angular velocity $\omega$; and means for issuing vector sum $\vec{V}_T(=\vec{V}+\vec{V}_R)$ of said follow-up speed vector $\vec{V}_R$ and said probe speed vector $V$ as a probe speed command and issuing said corrected angular velocity $\omega$ as a speed command of the rotary table, whereby one axis copy control owing to the rotary table is incorporated in addition to three-axes copy control of the probe when the rotary table is not used, to assure simultaneous four-axes copy control keeping unchanged said direction of the probe with regard to said measuring reference line of the object.

8. An apparatus according to claim 7 wherein said probe is a contact type displacement detecting probe capable of copy measurement in contact with the object.

* * * * *